United States Patent [19]

Schepers

[11] Patent Number: 5,712,996

[45] Date of Patent: Jan. 27, 1998

[54] PROCESS FOR DIVIDING INSTRUCTIONS OF A COMPUTER PROGRAM INTO INSTRUCTION GROUPS FOR PARALLEL PROCESSING

[75] Inventor: Jörg Schepers, München, Germany

[73] Assignee: Siemens Aktiengesellschaft, Munich, Germany

[21] Appl. No.: 513,976

[22] PCT Filed: Mar. 1, 1994

[86] PCT No.: PCT/DE94/00221

§ 371 Date: Sep. 14, 1995

§ 102(e) Date: Sep. 14, 1995

[87] PCT Pub. No.: WO94/22079

PCT Pub. Date: Sep. 29, 1994

[30] Foreign Application Priority Data

Mar. 15, 1993 [DE] Germany ............ 43 08 173.8

[51] Int. Cl.$^6$ ............................................. G06F 9/40
[52] U.S. Cl. ..................... 395/392; 395/706; 395/709
[58] Field of Search ........................ 395/706, 709, 395/392

[56] References Cited

U.S. PATENT DOCUMENTS

| | | | |
|---|---|---|---|
| 5,021,945 | 6/1991 | Morrison et al. | 395/392 |
| 5,317,743 | 5/1994 | Imai et al. | 395/706 |
| 5,450,585 | 9/1995 | Johnson | 395/709 |

FOREIGN PATENT DOCUMENTS

| | | |
|---|---|---|
| 0 501 653 | 9/1992 | European Pat. Off. . |
| WO 91/20031 | 12/1991 | WIPO . |

OTHER PUBLICATIONS

"Efficient Instruction Scheduling for a Pipelined Architecture" by P.B. Gibbons and S.S. Muchnick, Sigplan Notices, vol. 21, No. 7, Jul. 1986, pp. 11–16.

"Instruction Scheduling for the IBM RISC System/6000 Processor", by H.S. Warren, Jr., IBM Journal of Research and Development, vol. 34, No. 1, Jan. 1990, pp. 85–92.

"Performance Evaluation for Various Configuration of Superscalar Processors", by A. Inoue and K. Takeda, Computer Architecture News, vol. 21, No. 1, Mar. 1993, pp. 4–11.

"An Efficient Algorithm for Exploiting Multiple Arithmetic Units", by R.M. Tomasulo, IBM Journal of Research and Development, Jan. 1967, pp. 25–33.

"A Brief Survey of Papers on Scheduling for Pipelined Processors", by S.M. Krishnamurthy, Sigplan Notices, vol. 25, No. 7, Jul. 1990, pp. 97–100.

"Trace Scheduling: A Technique for Global Microcode Compaction", by J.A. Fisher, IEEE Transactions on Computers, vol. 30, No. 7, Jul. 1981, pp. 478–490.

*Primary Examiner*—Parshotam S. Lall
*Assistant Examiner*—Gautam R. Patel
*Attorney, Agent, or Firm*—Hill, Steadman & Simpson

[57] ABSTRACT

In order to be able to execute rapid processing of a program on super-scalar microprocessors, the individual instructions of this program must be divided into instruction groups, which can be processed by processing units of the microprocessor, in such a way that the instructions can be processed in parallel. In this case, it is necessary to take account of data-flow dependences and control-flow dependences as well as pipeline conflicts. For this purpose, the first step is to select the instructions whose precursor instructions have already been processed and to investigate these instructions as to whether before their execution a minimum number of delay cycles is necessary, and the instructions are stored with a minimum number in a list. From these instructions, one is selected using a heuristic selection process, and this one is classified into an instruction group in which the instruction can be processed in the earliest possible execution cycle.

1 Claim, 1 Drawing Sheet

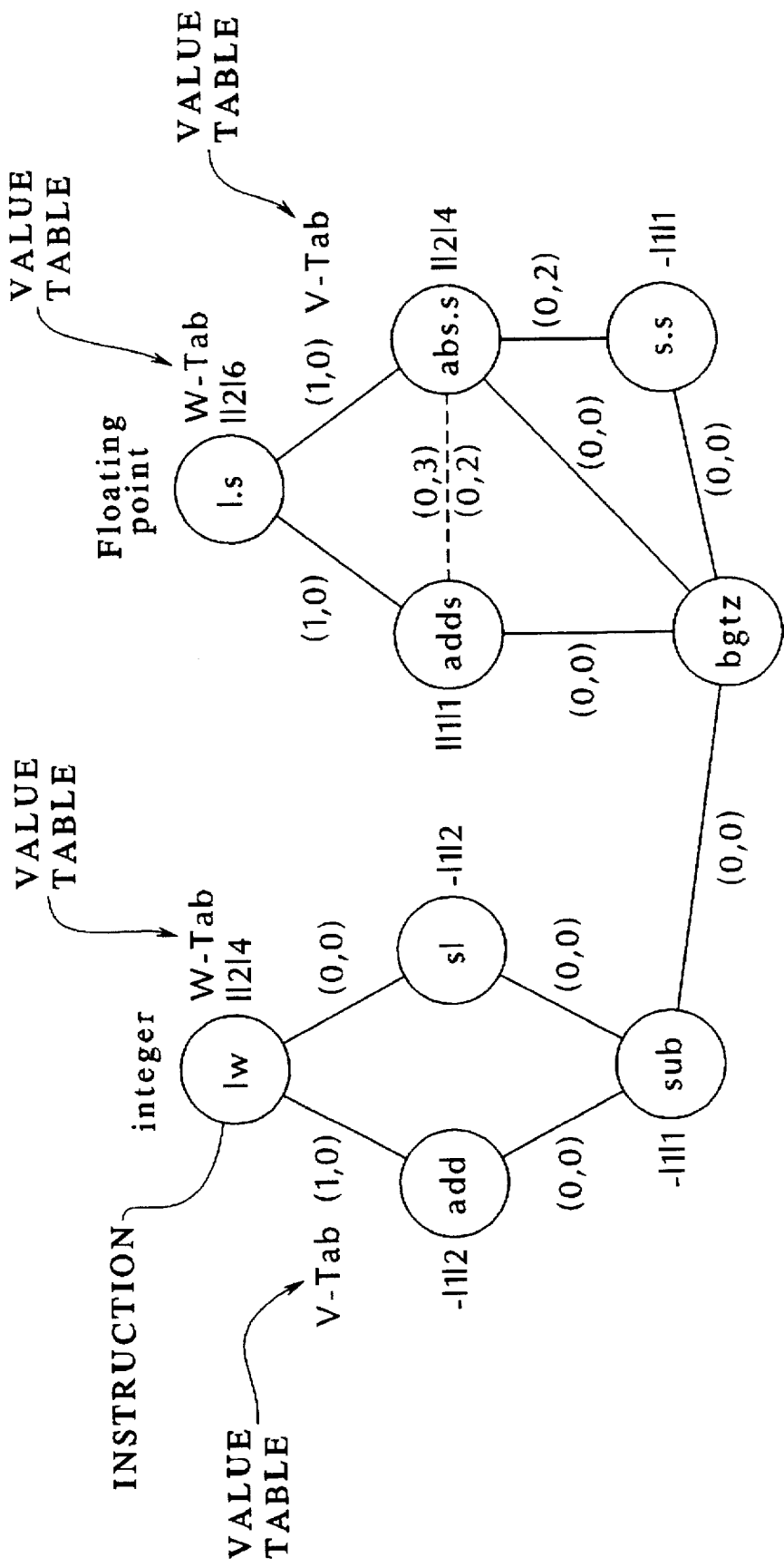

1

PROCESS FOR DIVIDING INSTRUCTIONS OF A COMPUTER PROGRAM INTO INSTRUCTION GROUPS FOR PARALLEL PROCESSING

BACKGROUND OF THE INVENTION

Modern microprocessors mostly comprise a plurality of functional units, which are termed processing units below, which can execute machine instructions in parallel. This property is designated as super-scalar. In order to utilize all the processing units, super-scalar processors would have to provide in one clock cycle a plurality of instructions as a group for execution. Since, however, processing units can mostly execute only specific types of machine instructions such as, for example, load/store or floating-position instructions, when providing instructions it must already be ensured that all the instructions of one group can be executed on appropriate processing units. When grouping instructions, it is necessary, in addition, to take account of data and control-flow dependences between the instructions, in order to satisfy the semantics of the program. Furthermore, it is essential to minimize pipeline conflicts within the processing units, in order to achieve as high as possible a throughput for each individual processing unit.

The grouping of instructions thus plays a substantial role in the effective performance of a super-scalar microprocessor. It is essential to arrange the instructions within an instruction sequence such that as many instructions as possible can be executed in parallel. For this reason, a plurality of approaches to the solution have already been developed and published, which can be subdivided into static and dynamic scheduling processes.

In the case of dynamic scheduling processes, instructions are regrouped during execution. This is mostly performed with the aid of special hardware such as, for example, "score boards" or "reservation tables". Appropriate techniques are described, inter alia, in Tomasulo, R. M., An Efficient Algorithm for Exploring Multiple Arithmetic Units, IBM Journal of Research and Development, January 1967, pages 25 to 33. In part, they require substantial additional outlay on hardware and mostly operate only on a permanently pre-defined number of instructions (instruction window).

Static scheduling processes already attempt at the compiling time to generate an instruction sequence in .which pipeline conflicts are minimized and as many instructions as possible can be executed in parallel. Various algorithms for this have been developed, in particular for processors having an instruction pipeline, as well as in the field of microprogramming and for VLIW architectures. A survey of the algorithms for super-pipeline architectures is given, for example, in Krishnamurthy, S. M., A Brief Survey of Papers on Scheduling for Pipelined Processors; SIGPLAN Notices, Vol. 25, No. 7, 1990, pages 97–106. These algorithms heuristically generate an instruction sequence with as few pipeline conflicts as possible, although conflicts between data-independent instructions are mostly left out of account.

The problems of instruction grouping, as they occur in super-scalar processors, are treated in terms of formulation in algorithms for code generation for VLIW architectures. In particular, use is made in this case of global scheduling processes such as trace scheduling or percolation scheduling which can shift instructions beyond boundaries of basic blocks (for example, Fisher, J. A., Trace Scheduling: A Technique for Global Microcode Compaction, IEEE Trans. on Comp., July 1981, pages 478–490). By contrast with super-scalar architectures, in the case of VLIW architectures, however, statically long instruction words must already have been generated, that is to say the individual instructions are already assigned at the compiling time to the various processing units, and the instructions of an instruction word are executed synchronously. In this regard, super-scalar architectures offer more free spaces, since in a final analysis groupings of instructions are not undertaken until the run time, and not all the instructions of a group are executed synchronously.

SUMMARY OF THE INVENTION

The object on which the invention is based consists in specifying a further process according to which instruction groups which can be processed in parallel by a program are generated even for super-scalar processors, it being ensured that all the instructions of an instruction group can be executed without additional delay cycles. Such delay cycles can be conditioned in the case of a program without grouping by providing that there is a data dependence between the instructions, that is to say an instruction must have been executed before the data-dependent following instruction can be executed, or that there are pipeline conflicts in the pipeline structure which condition so-called interlock cycles.

In general terms the present invention is a process for the machine generation of secondary processable instruction groups from a program for super-scalar microprocessors. For each instruction of the program in a value table a blocking position is set, when before execution of an instruction directly dependent on data, a delay cycle is to be inserted. A succession number is inserted which indicates how many data-dependent instructions follow directly. A distance value is entered which specifies the maximum number of clock cycles up to the last of the data-dependent instructions. In a delay cycle table it is specified for each instruction how many delay cycles occur between the instructions. Each of the instructions is classified into instruction groups in the following steps. At first all the instructions are set as unmarked. All the instruction which have no preceding data-dependent unmarked instruction are stored in a first list. Those instructions from the first list are selected which can be executed after a minimum number of delay cycles, and these instructions are stored in a second list. An instruction is selected in accordance with a heuristic selection process. Each selected instruction is classified into an instruction group having components such that the instruction is assigned to the instruction group having the earliest permissible execution cycle. This corresponds to a prescribable sequence in one of the components. The classified instruction is marked. The steps for classifying are carried out until all the instructions of the program are processed.

Advantageous developments of the present invention are as follows.

The heuristic process consists in that an instruction is selected from the second list whose blocking position is set. In the event of a missing set blocking position the instruction with a maximum distance value and a maximum succession number is selected. In the case of a plurality of selected instructions, an arbitrary one of these instructions is selected.

The number of the components per instruction group is fixed in accordance with the number of the instructions which a microprocessor can load simultaneously.

The process according to the invention thus dispenses with a dynamic scheduling process, with the result that no additional hardware is required. Classifying the instructions into the instruction groups is, however, already performed during compiling, that is to say before the instruction processing is carried out.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE depicts data dependencies of individual instructions that are taken into consideration in the method of the present invention.

DESCRIPTION OF THE PREFERRED EMBODIMENTS

The process proceeds from a scheduling process which is described in Gibbons, P. B., Muchnick, S. S., Efficient Instruction Scheduling for a Pipelined Architecture, Proc. 86, Sigplan Notices, Vol. 21, No. 7, pages 11 to 16. The program section which is specified below and written in assembler code is used for the purpose of explanation:

| 1: | lw    | r3, | 0 (r4)  | #load word          |
| 2: | add   | r3, | r3, 1   | #add                |
| 3: | sl    | r4, | 1       | #shift left         |
| 4: | sub   | r3, | r3, r4  | #subtract'          |
| 5: | l.s   | f2, | 0 (r5)  | #load float         |
| 6: | add.s | f1, | f2, f1  | #add float          |
| 7: | abs.s | f3, | f2      | #float absolute     |
| 8: | s.s   | f3, | 0 (r5)  | #store float        |
| 9: | bgtz  | r3, | L1      | #branch greater zero |

The individual instructions are easy to understand with the aid of the explanations given next to the instructions. For example, instruction states that a word is to be loaded into the register r3, specifically from a memory location whose address is in register r4. In the second instruction the I is to be added to the contents of the register r3, and the result is to be stored in the register r3. Instruction 3 indicates that the data item in the register r4 is to be shifted to the left by one position. Instruction 4 is a substraction instruction, specifically that the contents of register r4 are to be subtracted from the contents of register r3 and the result stored in the register r3. The instructions I to 4 are so-called integer instructions. The instructions 5 to 9, by contrast, are floating-position instructions. Instruction 5 indicates that a floating-position number whose address is in the register r5 is to be loaded into the floating-position register f2. According to instruction 6, the contents of the floating-position register f1 are added to the contents of the floating-position register f2, and the result is stored in the floating-position register f1. The absolute value of the floating-position number is formed in the instruction 7, specifically the number which is in the register f2, and the result is stored in the floating-position register f3. The contents of the floating-position register f3 are stored in the memory at an address which is in the register r5, and at the every end there is executed in the instruction 9 a branch instruction in the case of which a jump is made to the address L1 when the contents of the register r3 are greater than zero.

The graphical representation of the single FIGURE is used to show the data dependences of the individual instructions, and thereby to provide a better illustration of the problems which occur in the case of parallel processing. The representation consists of nodes and edges, there being respectively arranged at the edges a delay cycle table V-Tab which specifies whether a delay cycle is required between two successive instructions. The first number shows the delay cycles which must be ensured by explicit NO-OPERATION (noop) instructions in the instruction sequence, while the second number shows the number, conditioned by pipeline conflicts, of delay cycles which are symbolized in the program with the aid of s-noop instructions. For example, in the case of the integer instructions a delay cycle is required if the instruction 2 is executed directly after instruction 1. By contrast, the instruction 3 is independent of the execution of the instruction 2, with the result that these instructions can be executed in parallel. However, on the basis of the data dependence it can be executed only after the instruction 1, since otherwise the memory address in register r4 would be wrong. A corresponding statement also holds for the floating-position instructions, which are represented on the right-hand side of the diagram. Here, delay cycles are specified in V-Tab at the first position on the basis of data dependence; delay cycles which are present on the basis of pipeline conflicts are specified at the second position. This means, for example, that the instruction 8 "s.s" cannot be executed without additional delay cycles until two further clock cycles have elapsed after execution of the instruction 7 "abs.s".

Furthermore, the dependence between instructions "add.s" and "abs.s" is specified in the single FIGURE. For example, "add .s" cannot be executed by the same processing unit after "abs.s" until after three delay cycles. Conversely, "abs.s" cannot be executed until two delay cycles after "add.s". This dependence does not exist in the case of processing on different units.

Before the process according to the invention is explained in detail, some terms which are used in the process remain to be defined:

1. Blocking position L; this is occupied when an instruction causes at least one delay cycle to one of the directly following instructions.
2. Succession number; this number indicates how many data-dependent succeeding instructions follow an instruction. The more successors an instruction has the higher is its priority in the classification of the instructions into the instruction groups.
3. Distance value; it specifies the maximum distance in clock cycles between the instruction under consideration and the last instruction in the diagram. The delay cycles are also to be taken into account in this case. Let: d (n, n') be the maximum number of delay cycles between an instruction n and a directly data-dependent succeeding instruction n', and let h (n') be the distance value of n'; it is then the case that the distance value of n follows from h (n):=0, where the number of successors is equal to 0, or h (n)=h (n')+d (n, n')+1, the maximum value being taken in the case of a plurality of direct successors n'.

These values are inserted into the value tables W-Tab, which are specified for the purpose of illustration at the individual nodes of the diagram of the single FIGURE. Proceeding from the left, the blocking position L is specified at the first position, the succession number at the second position, and the distance value at the third position. For example, in the case of the instruction 1 "lw", the blocking position L is set, since a delay cycle follows; the succession number is 2, since two data-dependent instructions follow directly; the distance value is 4 between the first instruction and the instruction 9. The other value tables, which are assigned to the other nodes, can be interpreted correspondingly.

The process according to the invention is now explained in further detail with the aid of the diagram of the single FIGURE and using Table 1 and Table 2. Table 1 shows how the individual instructions of the program section are successively treated and then assembled, in accordance with Table 2, into instruction groups which can be executed in parallel by the processing units of the super-scalar processor. It is assumed here in this regard as an example that the super-scalar processor can load datawords with a length of 3 instructions.

The investigation of the program section is always performed using the instructions which are first in the diagram according to the single FIGURE and have no precursor instructions on which they are dependent in terms of data. Subsequently, the investigation of the instructions following these instructions is performed, and it is always investigated into which instruction group an instruction is then to be classified. The aim is thus to classify the instructions into the instruction groups such that the number of required delay cycles is a minimum. This aim is achieved by means of the following process steps:

In the first step, the blocking position, the succession number and the distance value are calculated for each instruction and are stored in the value table W-Tab. The delay cycles are in the V-Tab.

It is ensured in the second step that all the instructions are unmarked.

In the third step, a first list CS is formed into which the instructions are taken which have no unmarked precursor instruction.

It is checked in the fourth step whether the first list CS is empty or not, and the process is terminated in the case in which the first list is empty.

In the fifth step, those unmarked instructions from the first list are determined which can be executed after a minimum number of delay cycles, and a second list RS is formed from these instructions.

In the sixth step, one of the instructions contained in the second list is selected in accordance with a heuristic selection process and is provided for classification into the instruction groups.

In the seventh step, the selected instruction is inserted into one of the instruction groups in a component. To this end, the earliest possible cycle is firstly determined in which the instruction selected in step 6 can be executed. Thereafter, the instruction group is selected which is executed in this clock cycle or else as soon thereafter as possible, and into which the instruction can be placed taking account of possibly present grouping restrictions caused by the architecture of the processor. Empty positions within the instruction group before the last instruction arranged must be filled up with s-noop instructions.

In step 8, the inserted instruction is marked and removed from the list CS. The process continues with step 3.

The heuristic selection process (step 6) can be performed, for example, in the following way:

—Firstly, there are Selected in the second list RS the instructions whose blocking position L is set. If there is only one such instruction, this instruction is selected. If there is a plurality of such instructions, or should there by no instruction having a set blocking position, the further procedure is as follows:

—From the second list, instructions are selected which have the highest distance value. If there are a plurality of instructions having the highest distance value, the instructions which have the highest succession number are selected from these.

—Whenever a plurality of equivalent instructions have been determined, one of the instructions can be freely selected and inserted into the instruction group in accordance with step 7. The heuristic selection process according to step 6 can, of course, also be performed in another way, for example the individual represented steps can be interchanged, which can, however, lead to worse solutions.

TABLE 1

|   | CS | RS | Instruction (cycle) |
|---|---|---|---|
| 1 | lw; l.s | lw; l.s | l.s (1) |
| 2 | lw,add.s; abs.s | lw | lw (1) |
| 3 | add; s1; add.s; abs.s | s1; add.s; | abs.s (3) |
| 4 | s1 s.s; add; add.s | abs.s | s1 (2) |
| 5 | add.s; s.s; add | add; s1; | add (3) |
| 6 | sub; add.s; s.s | add | add.s (3) |
| 7 | sub; s.s | sub; s.s; | sub (4) |
| 8 | s.s.. | add.s | s.s (5) |
| 9 | bgzt | sub; s.s s.s bgzt | bgzt (6) |

TABLE 2

| | Program Array | | |
|---|---|---|---|
| Cycle | KP 1 | KP 2 | KP3 |
| 1 | l.s | lw | s-noop BG1 |
| 2 | s1 | s-noop | s-noop BG2 |
| 3 | abs.s | add | add.s BG3 |
| 4 | sub | s-noop | s-noop BG4 |
| 5 | s-noop | s-noop | s-noop BG5 |
| 6 | s.s | bgzt | s-noop BG6 |

In Table 1, the first list is designated as CS in the first column, while the second list is designated as RS, and the third column specifies which instruction has been selected. In Table 2, the individual instruction groups BG are shown which are produced in accordance with the process. Specified in the first column is the processing cycle in which the instruction group is executed, and in a second column a first component KP1 of the instruction groups BG is specified, in a third column a second component KP2 of the instruction groups BG is specified, and in a fourth column a fourth component KP3 of the instruction groups BG is specified. Delay cycles are specified by s-noop within the individual instruction groups.

At first, the two Tables 1 and 2 are empty. It is assumed that the steps 1 and 2 have already been carried out. A start is therefore made with step 3 of the process. Initially, a search is made for the nodes or instructions which have no unmarked precursor. According to the single FIGURE, these are the instruction "lw" and the instruction "l.s". These two instructions are entered into the first row in Table 1 in the column CS. It is then investigated in step 5 which of these two instructions requires a minimum number of delay cycles. Both instructions can be executed without additional delay cycles, and the instructions are consequently inserted into the column RS. One of the two instructions is selected in step 6. Since both instructions have a set blocking position, the instruction is selected which has the largest distance value, and that is the instruction "l.s.". This instruction is now inserted into an instruction group in Table 2. With the agreement that the insertion into the instruction book is performed at the earliest possible execution cycle, and that, for example, at the permissible column (component) furthest to the left, the instruction of the instruction group in the cycle 1 is assigned to the component KP1. The instruction "l.s" is marked, and a start is made in turn with step 3 of the process.

After step 3, the instructions are selected which have no unmarked immediate precursors. Apart from "lw", these are now also the instructions "add.s" and "abs.s". These are inserted into the column CS. It is now investigated in step 5 which of these instructions can be processed after a minimum number of delay cycles, and these are inserted into the column RS. RS contains only the instruction lw, with the result that the latter is selected and likewise, in accordance with step 7, inserted in the first cycle at the second position KP2.

Yet a third operation is to be explained. A start is made again with step 3 and it is investigated which additional instructions have no unmarked precursor instructions. These are the instructions "add" and sl". Step 5 is carried out for all the instructions from CS, and it is established which instruction becomes ready for processing after a minimum number of delay cycles. These are the instructions "sl", "add.s" and "abs.s", which are then inserted into the second column RS. The step 6 is now carried out for the three instructions contained in the column RS. Apart from these, only the instructions "abs.s" and "add.s" are provided with a set blocking position, so that that one having the highest distance value ("abs.s") is selected. The latter must now be inserted into the instruction groups in the table. In this case, it has to be taken into account that "abs.s" cannot be executed until one delay cycle after "l.s". It is thus inserted in the cycle 3 in accordance with step 7.

A fourth operation is outlined as a conclusion to the explanation of the process. After marking the instruction "abs.s" in accordance with step 8, the instruction "s.s" is inserted into the column CS in step 3. The instructions "add", "sl" and "add.s" are additionally in this column. Only the instructions "add" and "sl" can be executed without a delay cycle, since "add.s" may be executed at the earliest two delay cycles after "abs.s". An instruction is selected according to step 6 between "add" and "sl". Since both have the same entries in W-Tab, one can be freely selected, for example "sl". The instruction "sl" must now be inserted into one of the instruction groups. It can be seen that the instruction "sl" can be executed immediately after execution of the instruction "lw", with the result that it can be arranged in the second cycle. In accordance with step 7, it is thus assigned to the first component KP1 of the second instruction group BG2. The instruction "sl" is marked, and then the procedure is continued again with step 3 of the process.

This takes place until no more instructions are contained in column 1 of Table 1. The result is instruction sequences BG1 to BG6 in accordance with Table 2.

It is positioned out that whenever in accordance with step 6 a plurality of similar instructions are present, one of the instructions can be freely selected, and consequently the instructions contained in one Instruction group can be different in accordance with this selection. All the positions not occupied so far in the instruction groups BG can be supplemented with snoop instructions. As a program array in Table 2 shows, only two processing units need to be capable of processing floating-position instructions.

The graphical representation of Table 2 shows that a two-dimensional representation is developed from a program. Consequently, the super-scalar processor is capable of fething not only one instruction per cycle, but it can fetch a group of instructions which can all be executed in parallel, without conflicts arising. The aim of the code generation for super-scalar processors, which consists in a maximum number of instructions being capable of being processed in parallel, is then achieved. Super-scalar processors thus require not instruction sequences, but sequences of instruction groups. This can be read off very well in Table 2. The number of components in the program array depends on the number of instructions which the processor can load simultaneously.

It remains to be mentioned that the insertion of the snoop instructions was necessary only for the explanation. For the code generation, the rows of the array are arranged one behind another, for example from left to right, and the snoop instructions are cancelled.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for machine generation of secondary processable instruction groups from a program for super-scalar microprocessors, a) for each instruction of the program setting a blocking position in a value table when, before execution of an instruction directly dependent on data, a delay cycle is to be inserted, inserting a succession number into the value table which indicates how many data-dependent instructions follow directly, entering a distance value which specifies a maximum number of clock cycles up to a last of the data-dependent instructions, b) specifying in a delay cycle table for each instruction how many delay cycles occur between instructions, c) classifying each of the instructions into instruction groups as follows, aa) initially setting all the instructions as unmarked, ab) storing all instructions which have no preceding data-dependent unmarked instruction in a first list, ad) selecting instructions from the first list which can be executed after a minimum number of delay cycles, and storing the selected instructions in a second list, ae) selecting an instruction in accordance with a heuristic selection process, the heuristic process of selecting an instruction from the second list having the steps of: identifying each instruction in the second list which has a blocking position that is set; when no instructions are identified, selecting from the second list an instruction having a maximum distance value and a maximum succession number; when only one instruction is identified, selecting from the second list an instruction having a maximum distance value and a maximum succession number; when only one instruction is identified, selecting from the second list said identified instruction; when a plurality of instructions are identified, arbitrarily selecting an instruction from said plurality of instructions, af) classifying each selected instruction into an instruction group having components such that each selected instruction is assigned to the instruction group having an earliest permissible execution cycle, and in one of the components according to a predetermined sequence.

* * * * *